United States Patent
Murota et al.

(10) Patent No.: US 8,079,788 B2
(45) Date of Patent: Dec. 20, 2011

(54) MACHINE TOOL WITH MAIN BODY COVERED WITH COVER

(75) Inventors: Masahiro Murota, Yamanashi (JP); Hiroki Tezuka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 957 days.

(21) Appl. No.: 12/044,250

(22) Filed: Mar. 7, 2008

(65) Prior Publication Data

US 2008/0247835 A1     Oct. 9, 2008

(30) Foreign Application Priority Data

Apr. 3, 2007    (JP) .................. 2007-097337

(51) Int. Cl.
*B23Q 11/14*    (2006.01)
(52) U.S. Cl. ............ 409/134; 408/67; 408/56; 409/135; 409/137
(58) Field of Classification Search .......... 408/56, 408/57, 59, 61, 67; 409/134–137, 235, 238; B23Q 11/12, 11/14, 11/00, 11/08
See application file for complete search history.

(56) References Cited

U.S. PATENT DOCUMENTS

| | | | | |
|---|---|---|---|---|
| 5,893,690 A | * | 4/1999 | Haninger | 409/134 |
| 5,980,172 A | * | 11/1999 | Shoda | 409/203 |
| 6,675,549 B1 | * | 1/2004 | Kaneda et al. | 52/749.1 |
| 6,835,031 B2 | * | 12/2004 | Tanigawa | 409/134 |
| 6,884,009 B2 | * | 4/2005 | Maeda | 409/134 |
| 7,182,720 B2 | * | 2/2007 | Shiraishi et al. | 483/3 |

FOREIGN PATENT DOCUMENTS

| | | | | |
|---|---|---|---|---|
| EP | 879671 A2 | * | 11/1998 | |
| JP | 61103753 A | * | 5/1986 | |
| JP | 06047646 A | * | 2/1994 | |
| JP | 7-48366 Y | | 11/1995 | |
| JP | 2000-084701 A | | 3/2000 | |
| JP | 2001-087964 A | | 4/2001 | |
| JP | 2001252846 A | | 9/2001 | |
| JP | 2001-341048 A | | 12/2001 | |
| JP | 2002-200539 A | | 7/2002 | |
| JP | 2003-124150 A | | 4/2003 | |
| JP | 2003-275940 A | | 9/2003 | |
| JP | 2003291050 A | | 10/2003 | |
| JP | 2005-254334 A | | 9/2005 | |
| JP | 2006102939 A | | 4/2006 | |

OTHER PUBLICATIONS

EP Search Report for EP08102427 dated Jul. 9, 2008.
Notice of Reasons for Rejection for JP 2007-097337 mailed Jul. 8, 2008.

* cited by examiner

*Primary Examiner* — Daniel Howell
(74) *Attorney, Agent, or Firm* — Lowe Hauptman Ham & Berner LLP

(57) ABSTRACT

A main body of a machine tool is covered with a cover. A ceiling portion of the cover that is situated over a spindle motor is provided with an opening portion. The cover is provided with hanging portions that hang down from the opening portion with a predetermined clearance from side surfaces of the spindle motor other than the rear surface. Air that is mixed with a misty cutting fluid in a space inside the cover is sucked in through a suction pipe by a mist collector. The outside air flows into the space inside the cover through the clearance. The outside air that passes through the clearance is driven to flow through vents by a built-in cooling fan of the spindle motor, thereby cooling the motor, and is then discharged to the outside. In consequence, the temperature in the space inside the cover can never be increased by heating of the spindle motor.

4 Claims, 3 Drawing Sheets

MACHINE TOOL WITH MAIN BODY COVERED WITH COVER

RELATED APPLICATIONS

The present application is based on, and claims priority from, Japanese Application Number 2007-097337, filed Apr. 3, 2007, the disclosure of which is hereby incorporated by reference herein in its entirety.

BACKGROUND OF THE INVENTION

1. Field of the Invention

The present invention relates to a machine tool with a main body covered with a cover of a type such that air inside the cover is sucked in by a mist collector.

2. Description of the Related Art

In order to increase the productivity of machine tools, their spindles are being improved for higher-speed rotations and higher outputs. To attain this, a cutting fluid is generally jetted onto a tool and a machining area of a workpiece, thereby cooling the tool. In the machine tool in machining operation, the cutting fluid is repelled and scattered as a mist by the tool that is rotating at high speed. A main body of the machine tool is covered with a cover in order to prevent the mist from being scattered to the outside of the machine tool. Further, the misty cutting fluid that is caught inside the cover is sucked in and recovered together with air in the machine tool by means of a mist collector that is connected to the cover. Here, "main body" of a machine tool means all constituent elements of the machine tool with a cover excluded.

Referring now to the top view of FIG. 4 and the side view of FIG. 5, there will be described a prior art example of the machine tool, in which the main body of the machine tool is covered with the cover and the misty cutting fluid is sucked in and recovered together with air from a sealed space inside the cover by means of the mist collector.

A cover 1 is disposed on a base 10 of the machine tool so as to enclose the main body of the machine tool and cut off and seal the interior (machining area) of the machine tool from the outside. The cover 1 covers a spindle head 3, spindle 4, tool 5, table 6, etc. of the machine tool. The spindle head 3 is driven in a vertical direction (Z-axis direction) by a Z-axis motor Mz. The spindle 4 is rotatably mounted on the distal end of the spindle head 3 and is rotated by a spindle motor Ms that is mounted on the spindle head 3. The table 6 is driven in an X-axis direction perpendicular to the Z-axis direction by an X-axis motor (not shown). The table 6 is also driven in a Y-axis direction perpendicular to the X- and Z-axis directions by a Y-axis motor My. In FIGS. 4 and 5, numerals 1a and 1b denote a ceiling portion of the cover 1 and a door of the cover 1 in front of the machine tool, respectively, and numeral 9 denotes a handle of the door 1b.

A workpiece (not shown) is mounted on the table 6, while the tool 5 is mounted on the distal end of the spindle 4. A cutting fluid is jetted onto the tool 5 and the machining area of the workpiece through a cutting fluid supply pipe 11 as the spindle motor Ms is driven to rotate the spindle 4 and the tool 5. Further, X-, Y-, and Z-axis motors Mx, My and Mz as feed axis motors are drivingly controlled to enable the tool 5 to machine the workpiece. The fed cutting fluid is discharged from the machine tool through a trough 12 at its lower part and recovered.

Since the spindle 4 and the tool 5 rotate at high speed, the fed cutting fluid is repelled and scattered as a mist into the space inside the cover 1. The scattered cutting fluid is sucked in and recovered together with air through a suction pipe 7, which internally connects with the cover 1 and is located at an upper part of the machine tool, by the mist collector 2. The outside air flows into the space inside the cover through a clearance of the cover 1 that covers the main body of the machine tool. Since a space for the communication between the space inside the cover and the outside is particularly wide at a cutting fluid outlet portion of the trough 12 at the lower part of the machine tool, however, the outlet portion of the trough 12 forms a main inlet passage for the outside air that flows into the space inside the cover, as indicated by arrow A in FIG. 5.

Since the mist collector 2 sucks in the air from the space inside the cover, air flows into the inside space mainly through the cutting fluid outlet portion of the trough 12 at the lower part of the machine tool, as indicated by arrow A, and passes through the space inside the cover 1, as indicated by arrow C. Then, the air is sucked into the mist collector 2 through the suction pipe 7, as indicated by arrow D. Thus, the resulting misty cutting fluid is sucked in and recovered together with the air by the mist collector 2.

In the conventional machine tool, as described above, its main body is covered with the cover to prevent the misty cutting fluid from being scattered out into the space in which the machine tool is installed and polluting the environment. Further, the misty cutting fluid is sucked in and recovered together with the air from the space inside the cover by means of the mist collector that internally connects with the cover.

If the main body of the machine tool is covered with the cover, on the other hand, the temperature inside the cover is increased by heating of the motors. Since a temperature change exerts a bad influence on the machining accuracy, the temperature inside the cover must be prevented from increasing. A technique to attain this is described in Japanese Patent Application Laid-Open No. 2002-200539 such that an increase in temperature inside a cover is prevented by locating feed axis motors, such as X-, Y- and Z-axis motors, outside the cover.

Heat generating sources in the machine tool mainly include the machining area between the tool and the workpiece, the feed axis motors, i.e., the X-, Y- and Z-axis motors, and the spindle motor.

According to the aforesaid system of Japanese Patent Application Laid-Open No. 2002-200539, a temperature increase inside the cover is prevented by locating the X-, Y- and Z-axis motors outside the space that is covered with the cover. Since the spindle motor is mounted on the spindle head in order to drive the spindle to which the tool is attached, however, it is located in the space inside the cover. Since the spindle motor rotates the spindle and the tool at high speed, moreover, it generates more heat than the X-, Y- and Z-axis motors. Furthermore, the spindle motor is provided with a built-in fan for cooling the spindle motor at the rear part thereof. Air is sucked in from the distal end side of the spindle motor through vents formed in the outer periphery of the motor, and exhaust air is discharged to the rear side of the motor.

If the spindle motor constructed in this manner is located in the space inside the cover, therefore, the air inside the cover that is warmed by heat generated by the rotation of the spindle motor is sucked in by the built-in fan of the spindle motor and fed into the vents in the outer periphery of the motor. Thus, the cooling effect of the fan for the spindle motor is reduced inevitably.

Since the built-in fan of the spindle motor sucks in the air that contains the mist in the machine tool, moreover, the mist containing sludge that is produced by machining adheres to and locks the fan, thereby lowering the reliability of the system.

SUMMARY OF THE INVENTION

Accordingly, the object of the present invention is to solve the problems described above and reduce a temperature increase in a space inside a cover that covers a machine tool, thereby protecting a spindle motor.

A machine tool according to the present invention comprises a spindle head movable in the direction of a vertical axis, a spindle attached to the spindle head for rotation around the vertical axis, and a spindle motor which is mounted on the spindle head and rotates the spindle. The spindle motor includes a cooling fan for cooling the spindle motor, and a main body of the machine tool is covered with a cover, which is connected with a mist collector configured to suck in a mist and dust generated as a workpiece is machined, along with air inside the cover. In this machine tool, that part of the cover which is situated over the spindle motor is formed with an opening, and hanging portions are formed hanging down from an edge of the opening so as to surround the entire circumference of a housing of the spindle motor except for a rear region near the main body of the machine tool, with predetermined spaces between the hanging portions and the housing. Thus, the outside air which flows into a space inside the cover is air which flows in only through a clearance between the housing of the spindle motor and the hanging portions of the cover.

The size of the clearance may be set so that the flow resistance of an air passage defined by the clearance between the hanging portions and the housing of the spindle motor is lower than that of a passage for air which flows into the space inside the cover through any other region than the clearance.

The mist collector may have a air capacity higher than a value obtained by multiplying an area of projection of the spindle head on a horizontal plane by a maximum speed of movement of the spindle head in the direction of the vertical axis.

In the machine tool of the present invention constructed in this manner, the top part of the spindle motor is open, so that the cooling fan for the spindle motor can efficiently discharge air which has been used to cool the motor, and the temperature inside the cover can be made equal to the temperature for the case where the cover has no ceiling portion. Further, the outside air flows around the spindle motor before it flows into the space inside the cover, so that the air that is sucked in by the built-in fan of the motor never fails to be fresh outside air. In consequence, reduction of the cooling capacity can be prevented, so that the temperature of the spindle motor can be effectively restrained from increasing.

Since the space around the spindle motor is continually filled with the outside air in this manner, the cooling fan that is attached to the motor can never suck in misty air. Thus, the misty cutting fluid in the space inside the cover need not be discharged to the outside of the machine tool, so that reduction of reliability attributable to the misty cutting fluid can be suppressed.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
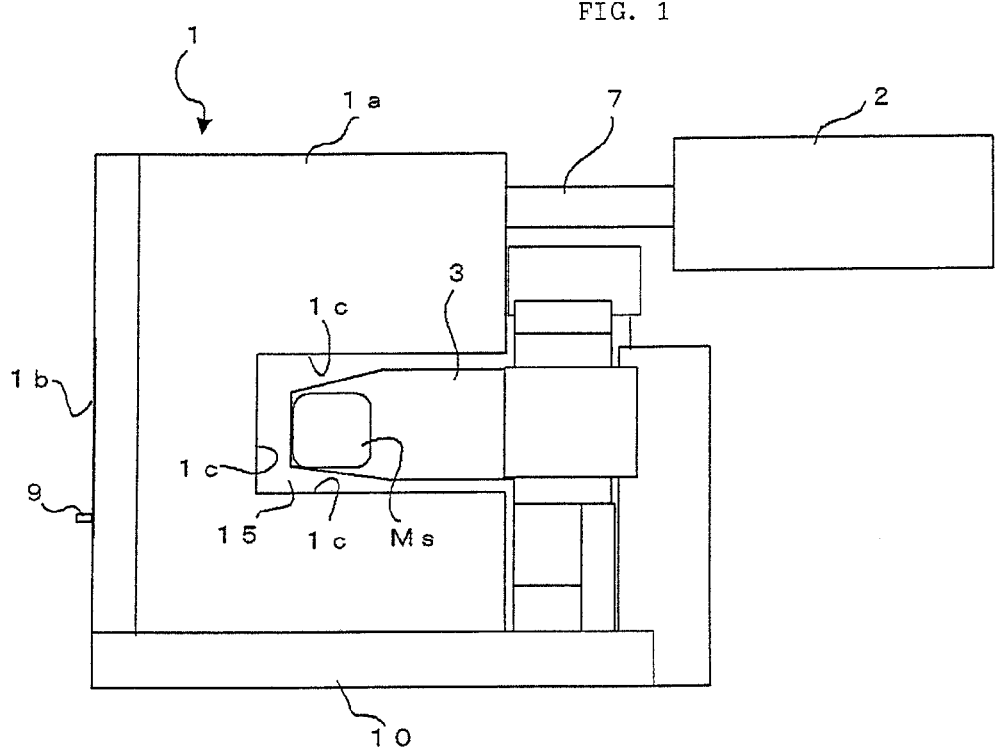
FIG. 1 is a top view of a machine tool according to one embodiment of the invention.
Figure 4:
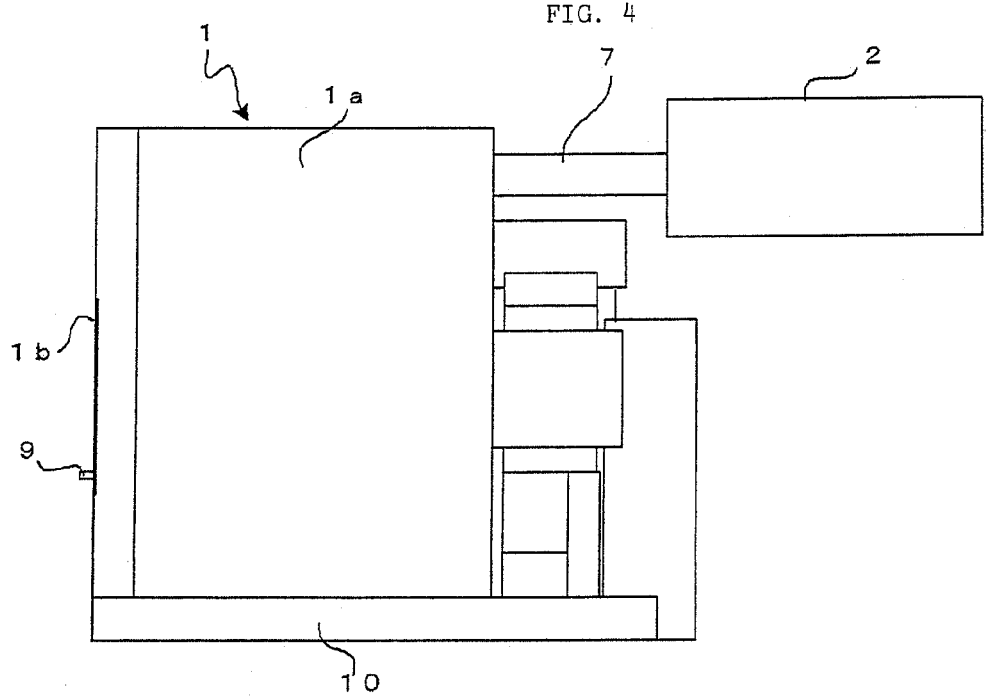
FIG. 4 is a top view of an example of a conventional machine tool.
Figure 5:
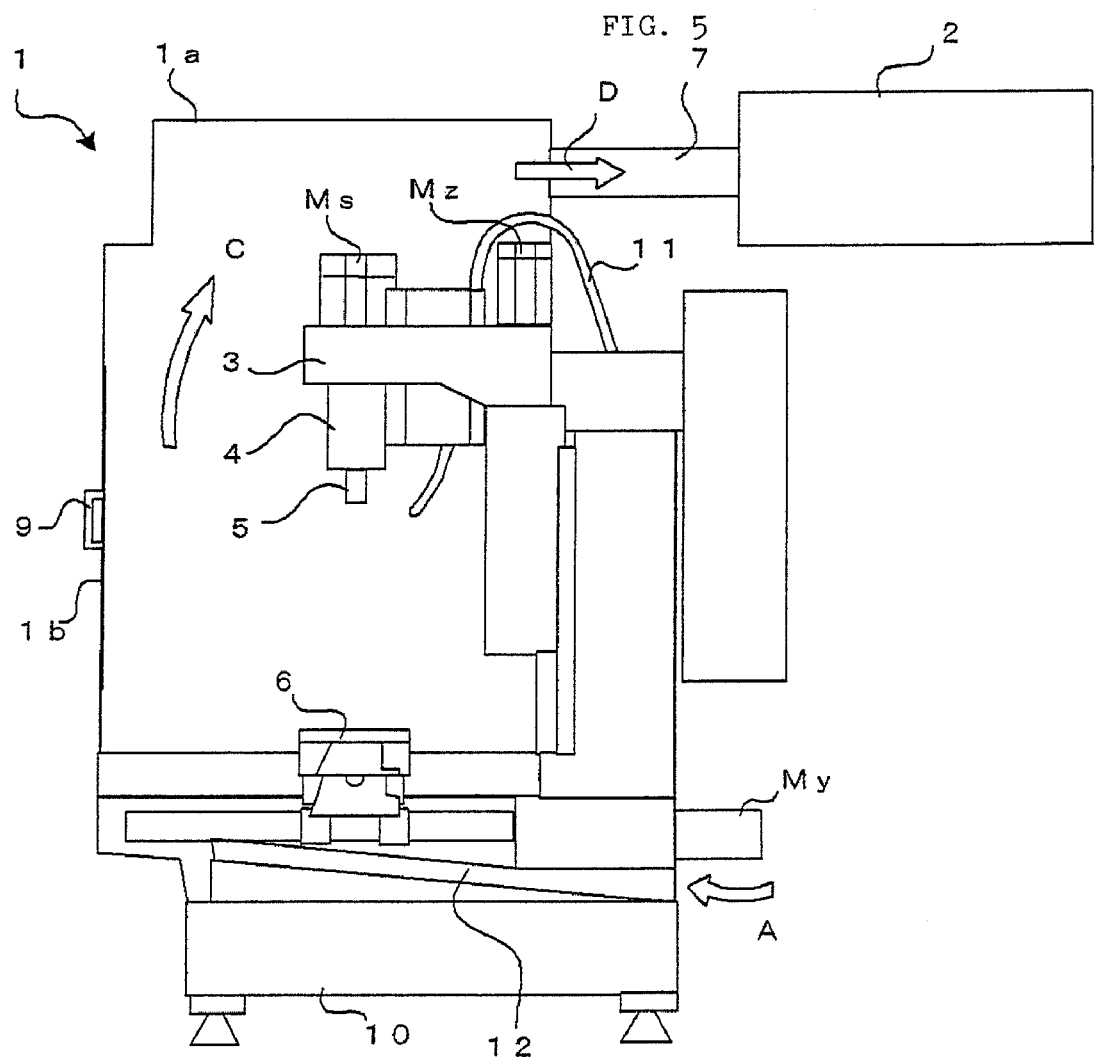
FIG. 5 is a side view of the machine tool of FIG. 4, from which one side portion of a cover that covers its main body is removed for visualization of the interior.

A machine tool according to one embodiment of the present invention will now be described with reference to FIGS. 1 to 3. The machine tool of this embodiment, like the conventional machine tool described before with reference to FIGS. 4 and 5, is provided with a cover 1 that covers a main body of the machine tool and a mist collector 2 that sucks in and recovers a cutting fluid together with air from a space inside the cover 1.

The main body of the machine tool of the present embodiment is constructed in the same manner as that of the aforementioned prior art machine tool except for the construction of the cover 1. More specifically, the ceiling portion 1a of the prior art cover 1 is configured to cover the entire top surface of the machine tool body. According to the present embodiment, however, a ceiling portion 1a of the cover 1 is provided with an opening portion 15 (see FIG. 3) above a spindle motor Ms, and hanging portions 1c hang down from an opening edge of the opening portion 15, as mentioned later. While the hanging portions 1c are disposed individually in front of and on the left- and right-hand sides of a housing of the spindle motor Ms with predetermined spaces therebetween, none is disposed at the back (i.e., on the rear side of the machine tool body) of the spindle motor Ms. In the arrangement shown in FIG. 3, the hanging portions 1c are disposed on the opposite sides, left and right, of the housing of the spindle motor Ms. However, the hanging portion 1c in front of the housing of the motor Ms is omitted from this illustration.

A space inside the cover 1 constructed in this manner communicates with the outside (behind and above the machine tool) through a clearance space 13 between the housing of the spindle motor Ms and the hanging portions 1c.

A tool 5 is mounted on a spindle 4, a workpiece is mounted on a table 6, and the spindle motor Ms is driven to rotate the spindle 4 and the tool 5. The cutting fluid is jetted onto the tool 5 and a machining area of the workpiece through a cutting fluid supply pipe 11. Further, an X-axis motor Mx and a Y-axis motor My for feed axes are driven to move the table 6 in X- and Y-axis directions as a Z-axis motor Mz is driven to move the spindle 4 or the like in a Z-axis direction. In this manner, the workpiece is machined by means of the tool 5. The cutting fluid supplied to the machining area is recovered outside the machine tool through a trough 12 at a lower part of the machine tool.

Further, the cutting fluid supplied to the machining area is repelled by high-speed rotations of the tool 5 and the spindle 4, and some of it is scattered as a mist into the space inside the cover 1. The scattered misty cutting fluid is sucked in and recovered together with air through a suction pipe 7 by the mist collector 2.

Figure 2:
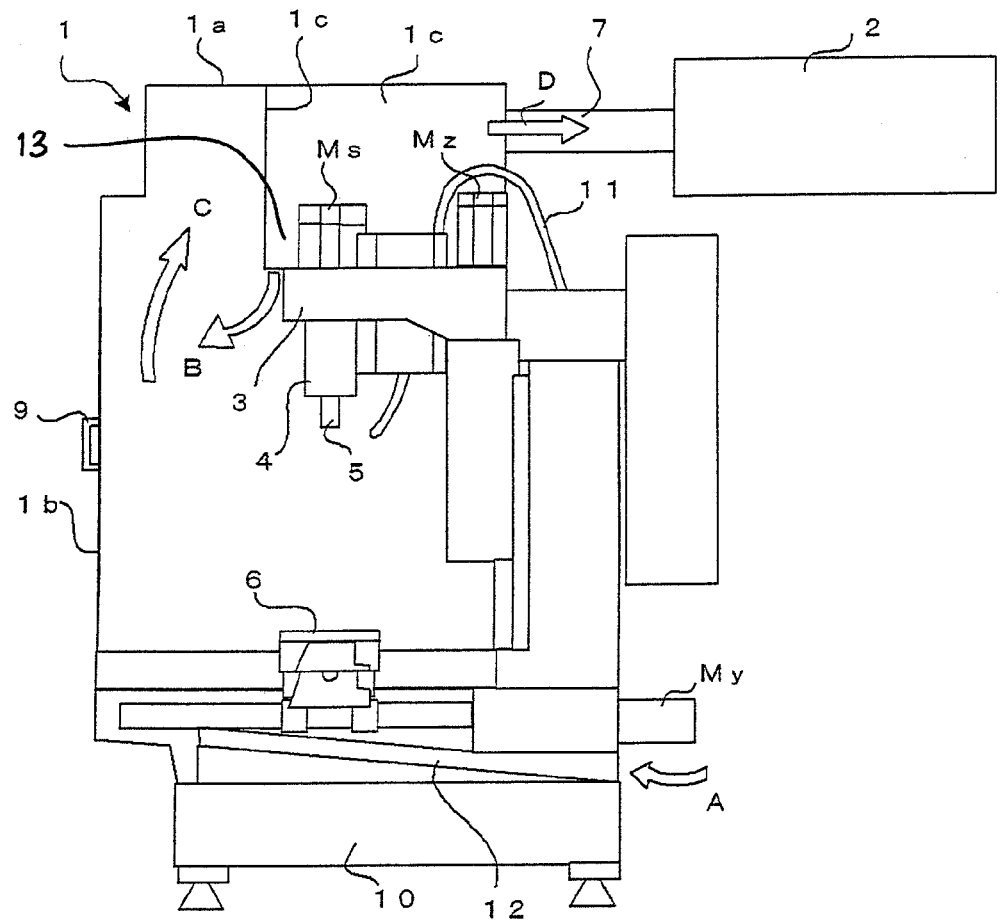
FIG. 2 is a side view of the machine tool of FIG. 1, from which one side portion of a cover that covers its main body is removed for visualization of the interior.

As the mist collector 2 is actuated to suck in the air from the space inside the cover 1, the outside air flows into the inside space through a cutting fluid outlet portion of the trough 12 at the lower part of the machine tool, as indicated by arrow A in FIG. 2. Further, the outside air flows into the space inside the cover 1 through the clearance space 13 between the housing of the spindle motor Ms and the hanging portions 1c of the cover 1, as indicated by arrow B. The air introduced into the space inside the cover 1 passes through the inside space, as indicated by arrow C, and is sucked in through the suction pipe 7 by the mist collector 2, as indicated by arrow D. Then, the misty cutting fluid that is mixed with the air is recovered by the mist collector 2.

As mentioned before, it is mainly through the cutting fluid outlet portion of the trough 12 and the clearance space 13 between the housing of the spindle motor Ms and the hanging portions 1c of the cover 1 that the outside air flows into the space inside the cover 1. Therefore, the flow resistance (air inlet resistance) of a passage that is defined by the clearance space 13 is made lower than that of a passage at the cutting fluid outlet portion of the trough 12 by adjusting the ratio between the respective opening areas of the clearance space 13 and the cutting fluid outlet portion. In consequence, the outside air flows into the space inside the cover 1 only through the low-resistance clearance space 13 between the housing of the spindle motor Ms and the hanging portions 1c of the cover 1.

Figure 3:
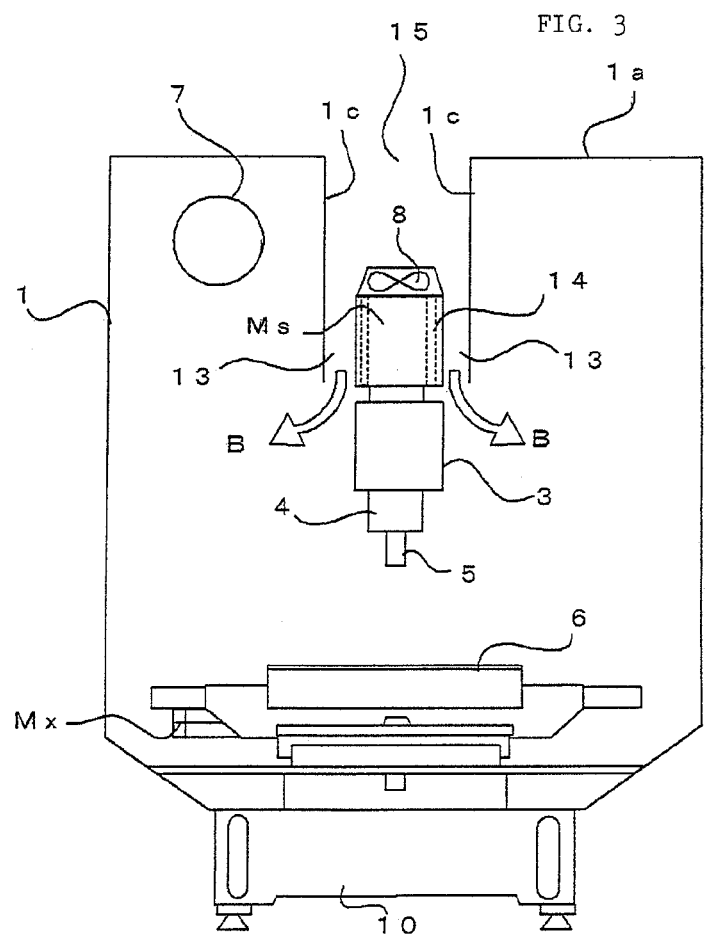
FIG. 3 is a front view of the machine tool of FIG. 1, from which a front portion of the cover is removed for visualization of the interior.

As shown in FIG. 3, the spindle motor Ms contains a cooling fan 8 in its upper part. Further, vents 14 penetrate the outer periphery of the motor Ms so as to extend from top to bottom. By rotating the fan 8, the outside air is introduced into the vents 14 and discharged to the outside, whereby the motor Ms can be cooled.

If the air capacity of the cooling fan 8 is higher than the air suction capacity of the mist collector 2, the air introduced into the vent 14 tends to include air mixed with misty cutting fluid in the space inside the cover 1 (that is, air in the space inside the cover 1 is discharged). To prevent the occurrence of such situation, the air suction capacity of the mist collector 2 is designed to be higher than the air capacity of the cooling fan 8. By doing so, a clearance space 13 between the housing of the spindle motor Ms and the hanging portions 1c is always filled with fresh air, and fresh air is introduced in the vent 14 of the spindle motor Ms, with the result that it is possible to prevent air in the space inside the cover 1 from being discharged.

As described above, the outside air flows into the space inside the cover 1 mainly through the clearance space 13 between the housing of the spindle motor Ms and the hanging portions 1c of the cover 1. Therefore, the air that flows into the vents 14 of the motor Ms as the cooling fan 8 rotates is fresh outside air in the clearance space 13 that is not mixed with the misty cutting fluid in the space inside the cover 1. Since the temperature of the outside air is lower than that of the air in the space inside the cover 1, moreover, a cooling effect for the spindle motor Ms is improved. The air having been driven by the cooling fan 8 to cool the motor Ms (i.e., air ejected from the vents 14) is discharged to the outside of the cover 1, so that the temperature of the air in the space inside the cover 1 can be prevented from increasing.

A spindle head 3 on which the spindle motor Ms is mounted is moved in the Z-axis direction (vertical direction) by the Z-axis motor Mz. In order to ensure that the air that flows into the vents 14 of the spindle motor Ms should never fail to be air outside the cover 1 despite the movement of the spindle head 3 in the Z-axis direction, therefore, the hanging length of the hanging portions 1c should preferably be increased so that the respective lower ends of the hanging portions 1c are situated below the upper ends (air inlets) of the vents 14 of the spindle motor Ms even when the spindle head 3 is lowered to its lowest position. However, the air that passes through the clearance space 13 between the housing of the spindle motor Ms and the hanging portions 1c has a speed in a direction along the side of the motor housing. Even if the lower ends of the hanging portions 1c are situated slightly above the position of the air inlets of the vents 14 of the motor Ms, therefore, any air other than the outside air cannot get into the vents 14.

When the spindle head 3 is moved in the Z-axis direction (vertical direction) by the Z-axis motor Mz, it gets into the space inside the cover 1, so that the capacity of the inside space is reduced correspondingly. In consequence, the air in the space inside the cover 1 may flow out (or back) through the clearance space 13 between the housing of the spindle motor Ms and the hanging portions 1c of the cover 1, in some cases. In order to prevent this situation, the air suction capacity of the mist collector is made higher than a value obtained by multiplying an area of projection of the spindle head 3 on a horizontal plane by a maximum moving speed of the spindle head (or an amount of air in the space inside the cover that is displaced per unit time when the spindle head is moved at the maximum moving speed). By doing this, the air can be prevented from flowing back in the clearance space 13 between the housing of the spindle motor Ms and the hanging portions 1c of the cover 1.

What is claimed is:

1. A machine tool with the main body thereof covered by a cover, wherein said machine tool comprises a spindle head holding a spindle rotating around a vertical axis and being movable in the direction of a vertical axis, spindle motor having a built-in fan and driving the spindle, and the cover covering a main body of the machine tool;

said cover has an opening at a portion above the spindle motor, hanging portions hang down from the opening along the sides of the spindle motor, except for the side facing the external side of the main body of the machine tool, with predetermined spaces between the hanging portions and the sides of the spindle motor; and said machine tool has a mist collector which has an air suction capacity higher than an air capacity of the built-in fan of said spindle motor and sucks in a mist and dust generated as a workpiece is machined, along with air inside the cover.

2. The machine tool according to claim 1, wherein a clearance between the hanging portions and the side of the spindle motor is formed such that flow resistance of an air passage defined by the clearance is lower than that of another air passage in which air flowing in the cover passes.

3. The machine tool according to claim 1, wherein the mist collector has a air capacity higher than a value obtained by multiplying an area of projection of the spindle head on a horizontal plane by a maximum speed of movement of the spindle head in the direction of the vertical axis.

4. The machine tool according to claim 2, wherein the mist collector has a air capacity higher than a value obtained by multiplying an area of projection of the spindle head on a horizontal plane by a maximum speed of movement of the spindle head in the direction of the vertical axis.

* * * * *